(12) United States Patent
Rudolph et al.

(10) Patent No.: US 7,774,375 B2
(45) Date of Patent: Aug. 10, 2010

(54) MEDIA FOUNDATION TOPOLOGY

(75) Inventors: Eric Rudolph, Woodinville, WA (US);
Kirt Debique, Seattle, WA (US);
Geoffrey T. Dunbar, Kirkland, WA
(US); Sohail Baig Mohammed,
Redmond, WA (US); Brian D. Crites,
Redmond, WA (US); **Robin C. B.
Speed, Hampshire (GB); Mei L. Wilson**,
Redmond, WA (US)

(73) Assignee: Microsoft Corporation, Redmond, WA
(US)

( * ) Notice: Subject to any disclaimer, the term of this
patent is extended or adjusted under 35
U.S.C. 154(b) by 2174 days.

(21) Appl. No.: 10/608,868

(22) Filed: Jun. 27, 2003

(65) Prior Publication Data

US 2004/0264383 A1 Dec. 30, 2004

(51) Int. Cl.
*G06F 17/30* (2006.01)
(52) U.S. Cl. ...................................... 707/802; 709/231
(58) Field of Classification Search ................ 707/609,
707/705, 790, 802; 709/227, 231, 232, 238,
709/246, 251, 252; 379/93.01, 93.18
See application file for complete search history.

(56) References Cited

U.S. PATENT DOCUMENTS 5,963,943 A * 10/1999 Cummins et al. ............. 707/10

| 2002/0038374 | A1* | 3/2002 | Gupta et al. ................ 709/231 |
| 2003/0133545 | A1* | 7/2003 | Rosset ..................... 379/93.01 |
| 2004/0267778 | A1 | 12/2004 | Rudolph |
| 2004/0267953 | A1 | 12/2004 | Dunbar et al. |
| 2004/0268369 | A1 | 12/2004 | Debique et al. |

OTHER PUBLICATIONS

Schwan et al., "Topologies"—Computational Messaging for Multicomputers, ACM, pp. 580-593.*
Nathan Faiman, David Giese, A Rokanuzzaman, Mark Schroeder, *A Survey of the Java Media Framework 2.0*, Feb. 23, 2000, 54 pages total.

* cited by examiner

*Primary Examiner*—Fred I Ehichioya (57) ABSTRACT

A multimedia processing system and methods provide flexibility and modularity by separating data flow information from maintaining of stream state for multimedia components. The system includes a media processor component to process received media data, a media session to determine a timeline for events to occur for performing media processing and a topology loader component to load a topology that describes a flow for the received media data to enable processing via an extensible symbolic abstraction of media objects. The topology loader ensures that events described in the topology occur. The system also includes core layer components such as media sink components to determine a media stream for output from the multimedia processing system and a media source component coupled to supply media data for processing. The topology created in the system symbolically provides data flow information, independent of maintaining a streaming state of control information.

32 Claims, 7 Drawing Sheets

MEDIA FOUNDATION TOPOLOGY

FIELD OF THE INVENTION

This invention relates generally to computer systems and, more particularly, relates to topology for a media playback system.

BACKGROUND OF THE INVENTION

As the abilities of computers expand into entertainment genres that once required separate electronic components, increased efficiency and user-friendliness is desirable. One solution is Microsoft's® DirectShow®, which provides playback of multimedia streams from local files or Internet servers, capture of multimedia streams from devices, and format conversion of multimedia streams. DirectShow® enables playback of video and audio content of file types such as MPEG, Apple® QuickTime®, Audio-Video Interleaved (AVI), WAV, Windows Media Audio (WMA) and Windows Media Video (WMV).

DirectShow® includes a system of pluggable filter components. Filters are objects that support DirectShow® interfaces and can operate on streams of data by reading, copying, modifying and writing data to a file. The basic types of filters include a source filter, which takes the data from some source, such as a file on disk, a satellite feed, an Internet server, or a VCR, and introduces it into the filter graph. A filter graph is an object which controls the streaming state of a collection of filters. There is also a transform filter, which converts the format of the data, and a rendering filter, which renders the data, for example to a display device or to a file on disk. Any filter which is not a source or sink of data is considered a "transform" filter. Other types of transform filters included in DirectShow® include effect filters, which add effects without changing the data type, and parser filters, which understand the format of the source data and know how to read the correct bytes, create times stamps, and perform seeks.

Each filter contains objects called "pins" that are used to connect to other filters. When filters are connected using the pins, a filter graph is created. Note there is a distinction between a "filter graph" which is the concept of a group of connected filters, and a "Filter Graph" which is the object you create in DirectShow® that controls the group of connected filters, the "filter graph". The "Filter Graph" is more correctly called a filter graph manager. To control the data flow and connections in a filter graph, DirectShow® includes a filter graph manager. The filter graph manager assists in assuring that filters are connected in the proper order. Filters must be linked appropriately. For example, the filter graph manager must search for a rendering configuration, determine the types of filters available, link the filters appropriate for a given data type and provide an appropriate rendering filter.

Although DirectShow® was an improvement in the field, DirectShow® has limitations. For example, DirectShow® requires the use of pins and has limited configuration flexibility. What is needed is expanded flexibility and modularity of a multimedia system.

BRIEF SUMMARY OF THE INVENTION

A multimedia processing system and methods provide flexibility and modularity by providing a system that separates the data flow information from the maintaining of stream state of multimedia components. The system includes a media processor component configured to process received media data, a media session to determine a timeline for events to occur for performing media processing and a topology loader component to load a topology that describes a flow for the received media data to enable processing via an extensible symbolic abstraction of media objects, the topology loader configured to ensure that events described in the topology occur. The system also includes core layer components such as media sink components to determine a media stream for output from the multimedia processing system and a media source component coupled to supply media data for processing. The topology created in the system symbolically provides data flow information, independent of maintaining a streaming state of control information. Thus, a topology enables dynamic adding and removing multimedia components from the topology and is the extensible symbolic abstraction of media objects that do not need instantiation.

According to embodiments, a topology can have several types of nodes such as a segment topology node configured to provide an encapsulated topology that can be inserted and deleted from a topology; a tee node to provide a primary and secondary output streams and to respond to logic dictating a discardability of data output from the primary and the secondary output stream; a demultiplexer node configured to split media into different types of media from a combined input.

In one embodiment a topology includes a plurality of nodes, each node including one or more of the media objects, each of the plurality of nodes identifiable via a unique identifier. The unique identifier enables sharing and reusing the nodes in a plurality of topologies.

Another embodiment is directed to a method for creating a data structure that defines a topology that identifies a flow of multimedia data through a collection of one or more media objects forming one or more nodes. The method includes identifying a connection between one or more nodes, and abstracting the connection between the nodes to enable the topology to be fully or partially specified independent of instantiation of the media objects.

In the embodiment, the abstracting enables a delay between negotiating media types for the topology and loading the media objects.

In another embodiment, the topology is accessible via one or more user interfaces allowing a user to pre-specify which media object to use prior to the topology being resolved or used by a media processor. The user interface enables a user to set static and dynamic properties for the media objects via a timeline source and to set properties on a proxy object, the proxy object being created, loaded with properties, and configured to follow through the topology and process data according to properties set on the media object associated with identified frames. A topology can be identified by one or more topology descriptors enabling interaction between a user and the topology. The topology descriptor can identify a collection of topology stream descriptors, each topology stream descriptor identifying a media stream.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, can be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
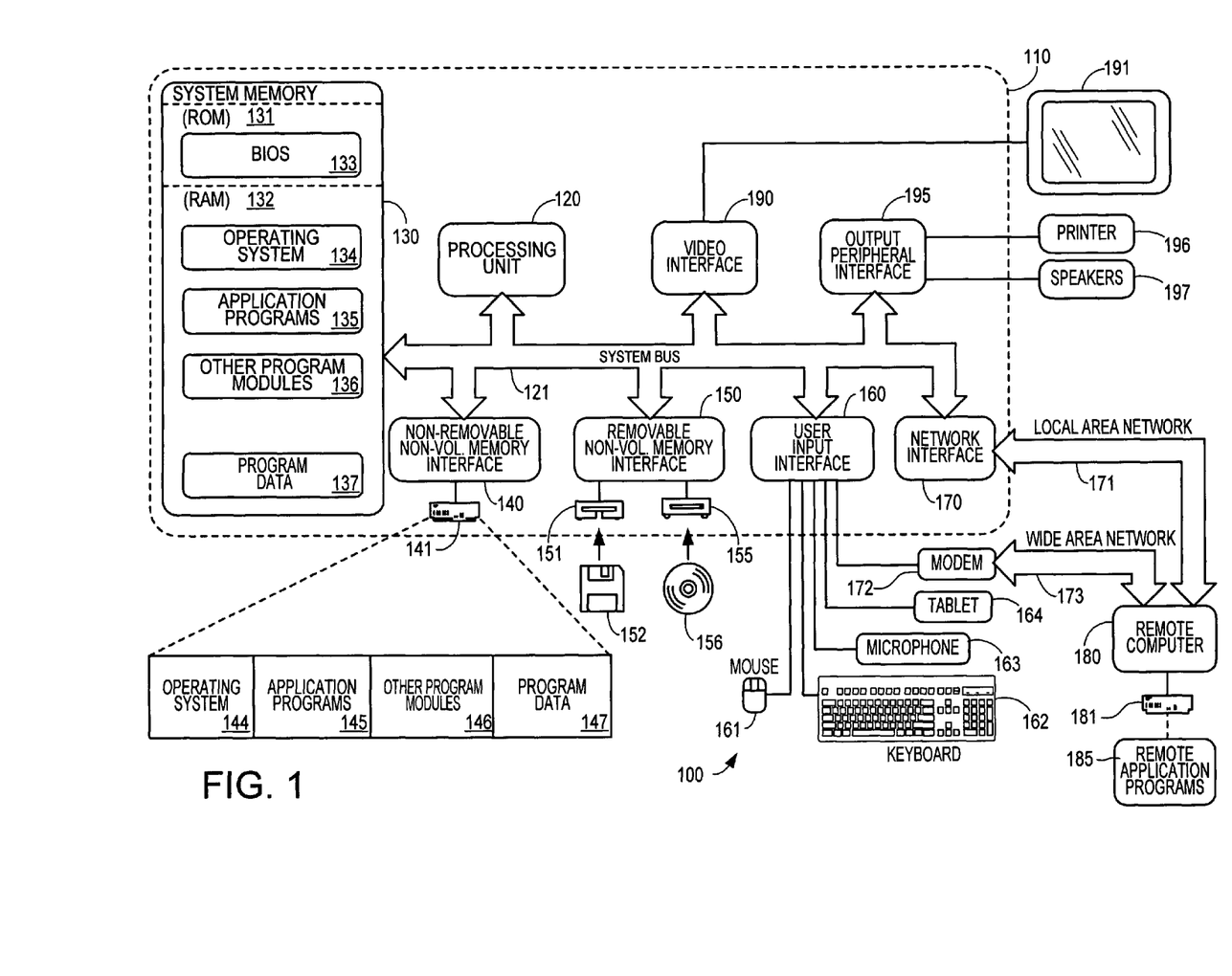
FIG. 1 is a block diagram generally illustrating an exemplary computer system on which the present invention resides.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components, including the system memory to the processing unit 120. The system bus 121 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media as well as removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 which are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise the source machine from which data is being migrated, and the remote computer 180 may comprise the destination machine. Note, however, that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. Those skilled in the art will appreciate that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that one or more of the acts and operations described hereinafter may also be implemented in hardware.

Figure 2:
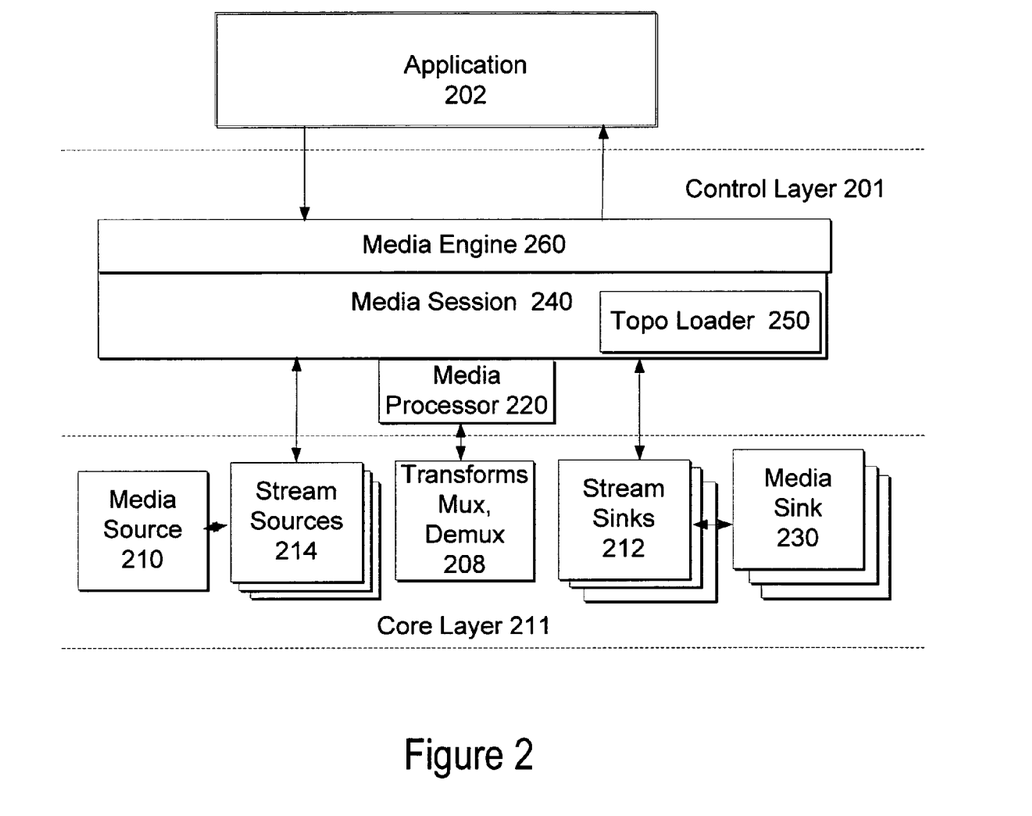
FIG. 2 is block diagram of a media processing system in accordance with an embodiment of the present invention.

Referring to FIG. 2, a Media Foundation architecture is described. Media Foundation is Microsoft's next generation multimedia architecture. Media Foundation is a componentized architecture. As shown, Media Foundation includes core layer 211 components that are responsible for some basic unit of functionality in Media Foundation, and Control layer 201 components, responsible for performing a more general tasks using the underlying Core component.

Core layer 211 components include media sources 210 and stream sources 214, which provide multimedia data through a generic, well-defined interface. There are many implementations of media sources, for providing multimedia data from different multimedia file types or devices. Core layer 211 further includes transforms shown in block 208, which perform some sort of transformation operation on multimedia data through a generic, well-defined interface. Transform examples are codecs, video resizers, audio resamplers, statistical processors, color resamplers, and others. Block 208 can further include demultiplexers, which take interleaved multimedia data as an input, and separate the data into individually useful media streams of multimedia data. Demultiplexers share a common, well-defined interface, and there are many implementations for demultiplexing different types of data. Block 208 further includes multiplexers, which take individual media streams and combine them into interleaved multimedia data. Multiplexers share a common, well-defined interface, and there are many implementations for multiplexing into different types of multimedia data. Core layer 211 further includes stream sinks 212 and media sinks 230. Media Sinks 230 accept multimedia data as input through a generic, well-defined interface. There are many implementations of media sinks for performing different functions with multimedia data. For instance, writing the multimedia data to a given file type, or displaying the multimedia data on a monitor using a video card.

Control layer 201 components use the core layer 211 components to perform higher level tasks in a simpler way. Typically a control layer component will use many different core layer components for a given task. For instance, playing back a multimedia file will involve a media source to read the file from disk and parse the data, one or more transforms to decompress the compressed multimedia data, and one or more media sinks to display the multimedia data. Control layer 201 includes media engine 260, which interacts with application 202 to receive and send media streams, media session 240, media processor 220 and topology loader 250, shown within media session 240. Topology loader 250 is a control layer component responsible for describing the data flow between the core layer components. A control layer components can be configured to avoid access to the more primitive core-level components used by the control layer. Data flows through system beginning with a media source 210, flowing through the media session 240, to media processor 220 and an output at media sink 230. Media session 240 guides when events in a topology occur, and the topology loader 250 ensures that events prescribed in a topology occur. Components in a topology include media source 210 components and media sink 230 components as well as other nodes as further explained in detail below. The media foundation system 200 provides interfaces and a layout for connecting streaming media objects. The system allows a user to specify connections between generic or specified sources, transforms, and sink objects via a symbolic abstraction using a topology concept.

A topology for purposes of the present inventions is a description of media sources and core layer components/objects that are connected in a certain order. A topology describes the flow of multimedia data through the collection of components. The components referenced in a topology node can include either actual object pointers or an object if there is enough information in the topology node to be able to create the required object. A topology can include a pointer to a fully instantiated multimedia component or provide enough information to create the multimedia component. The options allow a topology to be used without fully instantiating one or more of the multimedia components, and, thus, allows a user of a topology, such as an application or media engine 260 to perform efficient resource management while still using a topology structure.

The system overcomes the limitations present in prior art multimedia systems by providing a modular system that does not require actual "core layer components" always presented, and directly physically connected. Also, this new system separates the data flow information from the actual maintaining of the streaming state of the "core layer components", i.e., this system doesn't contain any run time streaming state. Moreover, the topology concept, according to embodiments herein, provides a node system, including source nodes, transform nodes, splitter nodes, tee nodes and segment topology nodes. A node is a representation of the data flow in and out of a given core layer component. A node in a topology represents a point at which data will be flowing in or out (or both) of a single unique core layer component. The node concept extends the prior art filter graph concept to a dynamic and extensible concept that allow switching out of nodes, and swapping nodes without affecting other nodes. Rather than a system that requires interconnectedness for functionality, the system illustrated in FIG. 2 provides an independently configurable node system with interchangeable nodes. The connections are virtual. That is, each node is initially connected symbolically without actually requiring a working (agreed upon) connection. The nodes, therefore, are an extrapolation of a possibility of a connection. No instantiation of the objects is required. Rather, a logic can apply after the symbolic connection to insert necessary filters and make connections. Overhead and associated components are inherently loaded once the symbolic connections are made. Because the connections are symbolic, the components can be shared or instantiated multiple times. In an embodiment, two partial topologies can reference a same component.

A Partial topology is a topology with only symbolic connections and between input and output. Connections in a partial topology are defined but not fully negotiated. Thus, additional components may need to be inserted into the topology in order to actually process the multimedia data. Partial topologies, in one embodiment, can be fully specified or not. A fully specified topology is a topology that describes every component relationship, but with all connections guaranteed to be successful when the media types are negotiated and objects are instantiated. The core MF objects in a fully-specified-yet-partial topology may not be instantiated yet. A fully specified topology is only different from a fully loaded topology by whether the objects are loaded or not. Each object in a fully loaded (not fully specified) topology is instantiated and each component is ready for processing. To save memory, a full topology can be reduced to a partial topology that is fully specified with objects that have been unloaded for memory saving purposes or for other reasons. The connections between nodes in an embodiment can have index-based connections rather than requiring pin objects.

Figure 3A:
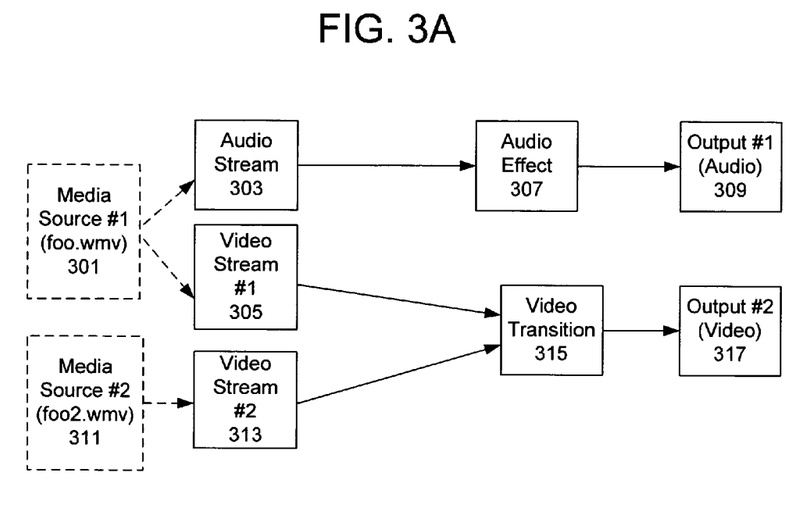
FIGS. 3A, 3B and 3C are block diagrams that illustrate topologies in accordance with an embodiment of the present invention.
Figure 3B:
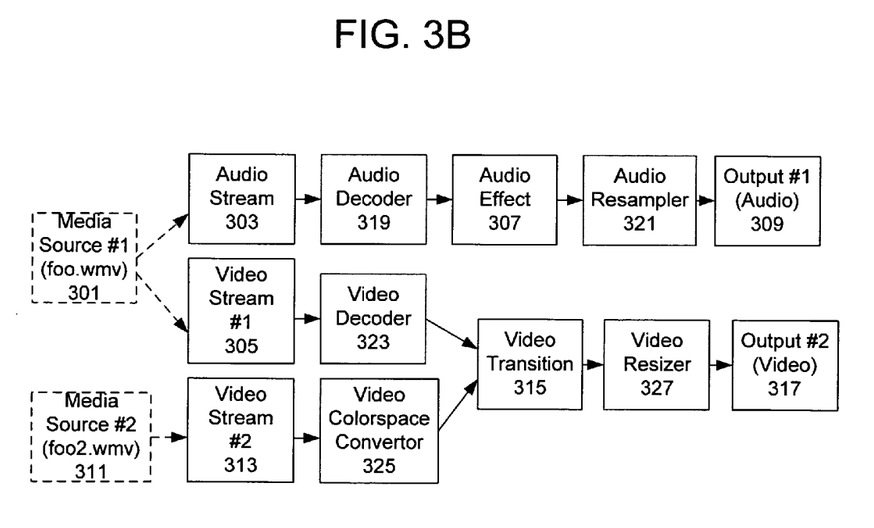

Referring now to FIGS. 3A and 3B, the partial and full topology concepts are exemplified. A fully specified topology guarantees that the data can be directly passed from one node to the next node. A partial topology contains topology nodes, but the data may not be able to be directly passed from one node to the next. For example, a partial topology could consist of only two nodes, a source node which will provide compressed data and a sink node which requires uncompressed data. In order to become a fully-specified topology, a decompressor node would need to be inserted between the two nodes. Also, for partial topology, a node may only contain enough information to instantiate an object. Therefore, objects therein may not need to be actually instantiated until the topology is resolved from a partial topology to a full topology. Because object instantiation can be delayed until the topology is resolved, an object or objects specification (it's abstract) can be shared among different topologies, given the restriction that only one topology is actively in use. For example, an effect node can be specified in several topologies by a CLSID (unique value). As long as only one topology is being used at a time, this CLSID can be mapped to one and only one currently running instantiated MF core object which does the processing.

FIG. 3A illustrates a partial topology showing media source #1 301 and media source #2 311. Media source #1 is shown coupled to produce audio stream 303 and video stream

1 305. Audio stream 303 is coupled to audio effect 307. Audio effect 307 is coupled to output #1 (audio) 309. Media source #2 311 is coupled to produce video stream #2 313. Video stream #1 305 and video stream #2 313 are both coupled to video transition 315. Video transition 315 is coupled to output #2 (video) 317. FIG. 3A is a partial topology because data cannot be passed from audio/video streams 303, 305, and 313 to block 307 and 315, respectively, without appropriate decoders/converters and the like. Likewise, data cannot be passed to outputs 309 and 317 without appropriate resizing/resampling.

FIG. 3B illustrates a full topology illustrating the same components shown in FIG. 3A, but including additional components to enable passing of data. Thus, audio stream 303 is shown coupled to audio decoder 319; and audio decoder 319 is coupled to audio effect 307. Audio effect 307 is coupled to audio resampler 321, which is further coupled to output #1 (audio) 309. Video stream #1 305 is coupled to video decoder 323, which is coupled to video transition 315. Video stream #2 313 is coupeld to video colorspace converor 325, which is coupled to video transition 315 as well. Video transition 315 is coupled to video resizer 327, which is further coupled to output #2 (video) 317. Importantly, FIG. 3B illustrates a topology in which data can be passed from media sources #1 and #2 301 and 311 through to outputs #1 and #2 309 and 317.

Figure 3C:
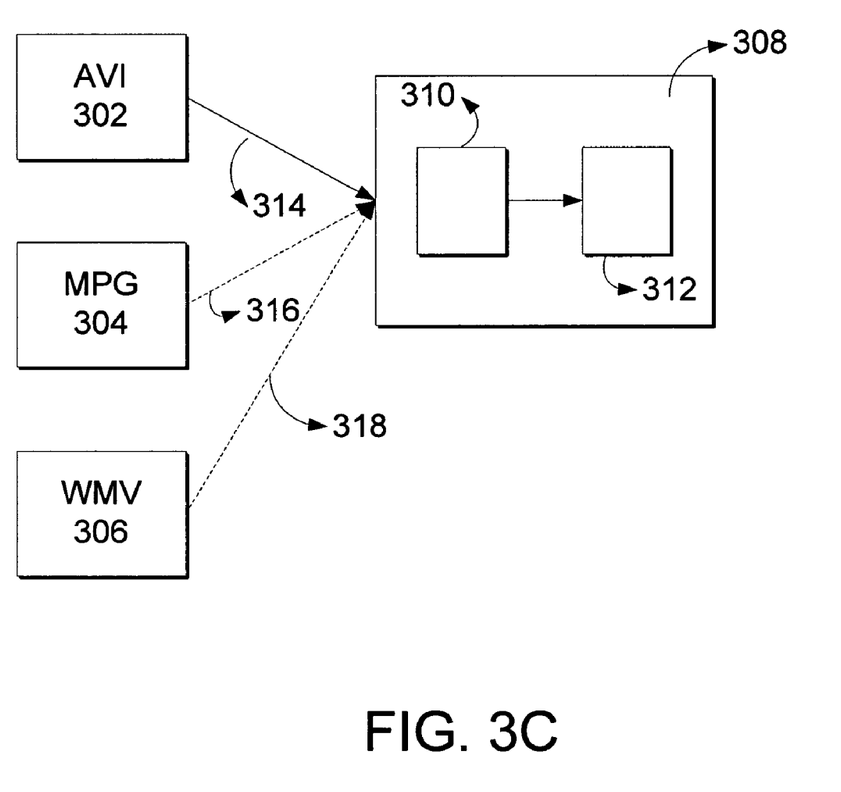

FIG. 3C illustrates a segmented topology, including Audio-Video Interleaved (AVI) signal 302, Motion Picture Experts Group (MPG) signal 304 and WMV 306. Block 308 illustrates a segmented topology node, including a two-node topology including nodes 310 and 312. Nodes 310 and 312 can perform a function, such as adding a grey scale to a media stream or the like. The nodes 310 and 312 make up a partial topology. Within nodes 310 and 312 are objects that need to be instantiated when the partial topology is connected to additional nodes to create a full topology. The segmented topology node 308 is shown connected to source node 302, representing an AVI input signal 302 via connection 314. According to an embodiment, a timeline or other mechanism can provide that segmented topology node 308 connect to MPG 304 or WMV 306 sequentially after AVI 302. Advantageously, the partial topology of nodes 310 and 312 can be re-used.

Segmented topology node 308 is a type of node that can have any number of inputs, and any number of outputs. The purpose of a segment topology node is to simplify the partial topology building process by enabling applications to build a topology as blocks of segment nodes, and by swapping, removing or replacing segmented topology nodes. Additionally, by using segments, topology loading performance is efficient. Segment topology nodes are the only type of node that does not correspond to a core-layer component; rather they correspond to a sub-topology. This concept is strictly for convenience; a topology containing segment topology nodes can always be reduced to an equivalent topology without segment topology nodes.

Figure 4:
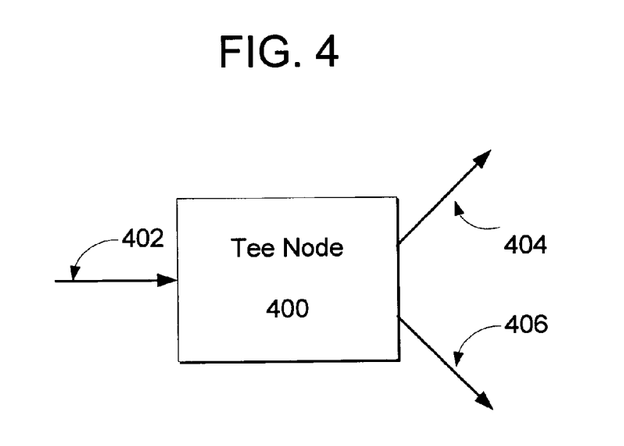
FIG. 4 is a block diagram illustrating a tee node in accordance with an embodiment of the present invention.

Referring now to FIG. 4, one type of node according to an embodiment is a tee node 400, in which an incoming stream 402 can be output from the node 400 via a primary stream 404 or a secondary stream 406. Primary stream 404 is connected to a 128 bit buffer 408 WMV, secondary stream 406 is connected to a 56 bit buffer. Alternatively, secondary stream 406 can be connected to a preview buffer 410. Preview buffer 410 can be a lossy type buffer by allowing dropped samples. The tee node provides multiple copies. A tee node can behave with logic. For example, if a user is capturing to a file and previewing at the same time, then the output of the tee node that goes to the preview component can be marked as discardable. Media processor 220 passes a lesser number of frames to the discardable stream as compared to the number of samples passed to the stream for which output is to a file.

Figure 5:
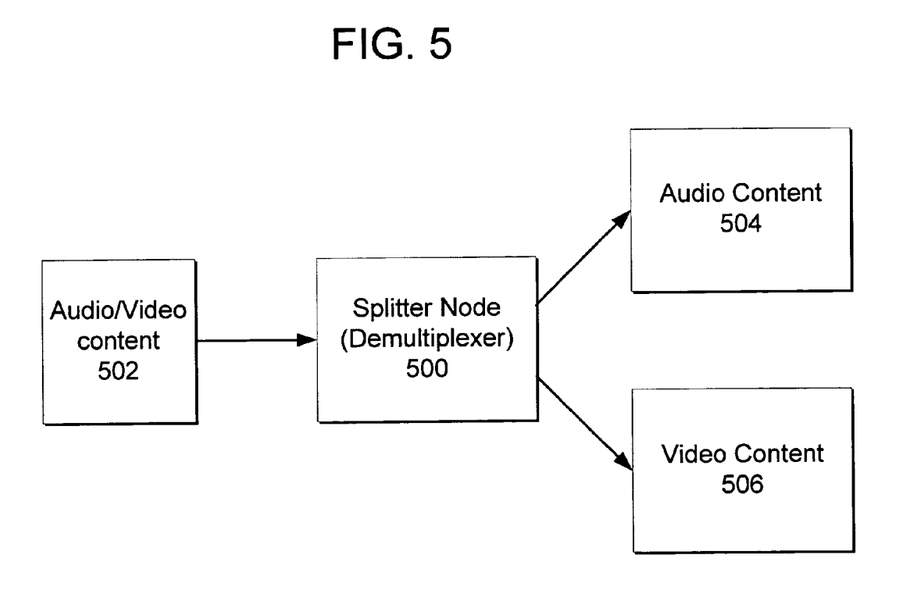
FIG. 5 is a block diagram illustrating a splitter node in accordance with an embodiment of the present invention.

Another type of node is a demultiplexer node. Referring to FIG. 5 illustrates a demultiplexer node 500. A source node 502 provides audio and video data to demultiplexer node 500. Demultiplexer node 500 outputs to a video decoder 504 and to an audio decoder 506. By splitting the data into audio and video data, the decoders can pass the data to audio transforms or video transforms respectively.

Figure 6:
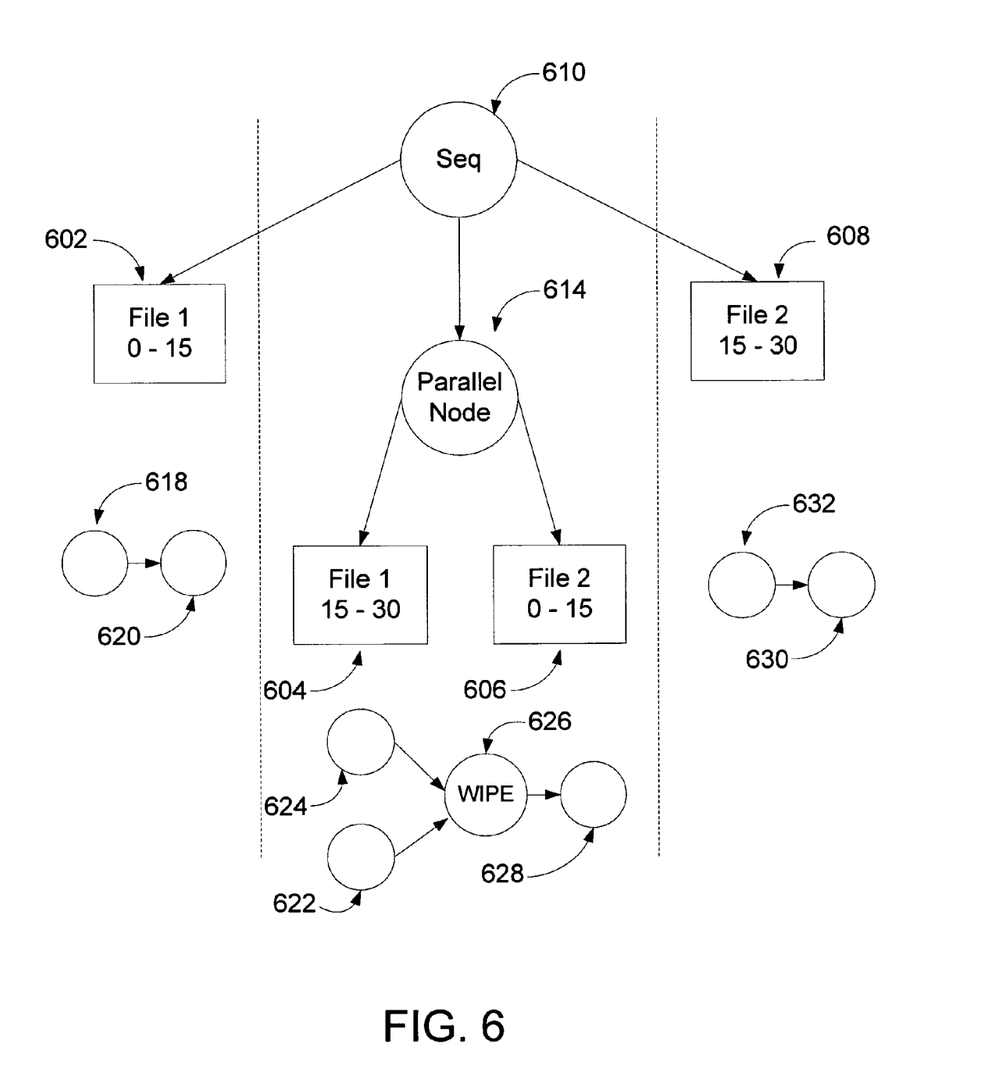
FIG. 6 is a block diagram illustrating a timeline source node and topologies in accordance with an embodiment of the present invention.

Referring now to FIG. 6, a block diagram is shown that illustrates a timeline source configuration and the corresponding partial topologies at all positions in the timeline. The timeline describes a multimedia presentation which changes through time, and the timeline source is responsible for creating the correct partial topologies for the timeline. In the example, files 1 and 2 are shown. Block 602 illustrates file 1 for time 0 to 15. Block 604 illustrates file 1 for time 15 to 30. Block 606 illustrates file 2 for time 0 to 15, and block 608 illustrates file 2 for time 15 to 30. Node 610 illustrates a sequence node for a timeline source, each file block 602 and 608 are played in sequence. Node 614 illustrates a parallel node and each file block 604 and 606 are played in parallel. Also shown in FIG. 6 are associated topologies for each file block 602-608 represented above the respective topology. For example, connected nodes 618 and 620 represent a partial topology associated with block 602. Node 618 represents a source input and node 620 represents an output sink. Likewise, nodes 622-628 represent nodes in a partial topology associated with block 604, 606 and node 614 above. Parallel node 614 is shown by having nodes 622 and 624 both coupled to node 626 perform a "wipe." Node 628 illustrates a sink for the topology. Nodes 632 and 630 illustrate a simple topology with a source 632 and sink 630 associated with block 608.

FIG. 6 illustrates how a timeline source generates topologies. Files 1 and 2 can represent video files, for example, that can be played as picture in picture or in another configuration, such as file 1 and then file 2. The resulting topologies illustrate that if Files 1 and 2, both 30 seconds in length, are supplied to a timeline source as shown, the output would present 15 seconds of file 1 followed by 15 seconds of file 2. The wipe illustrated could also be an effect, such as a picture in picture or the like.

Figure 7:
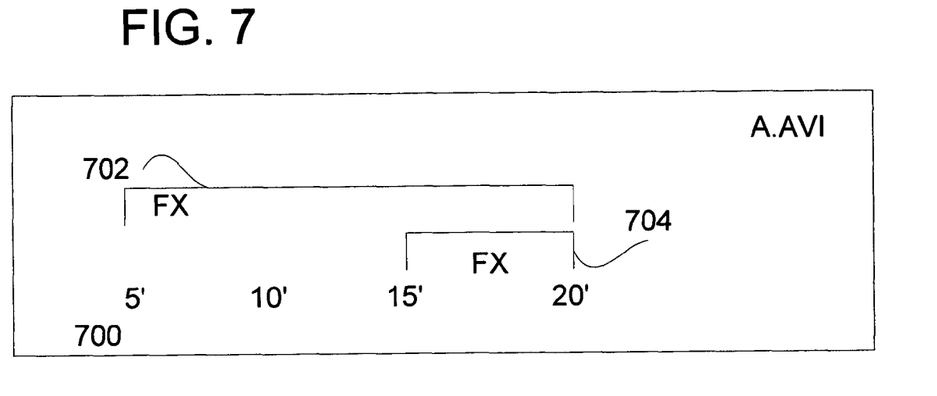
FIG. 7 is a block diagram illustrating effects possible on a timeline in accordance with an embodiment of the present invention.
Figure 8:
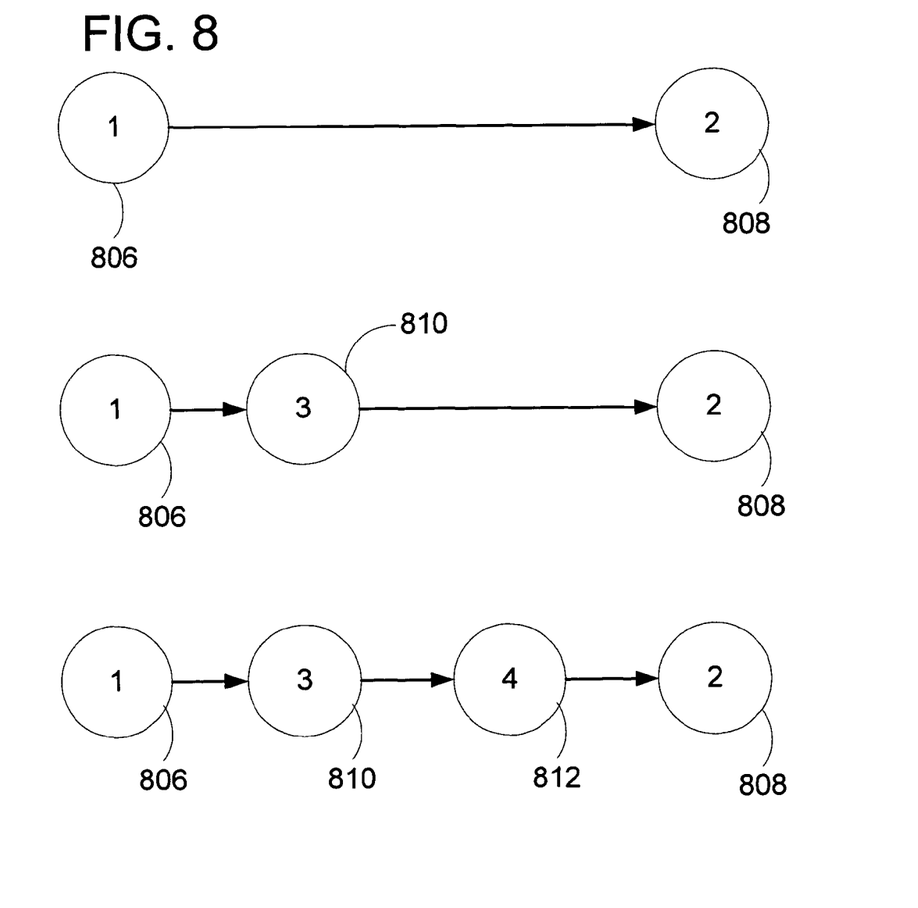
FIG. 8 is a block diagram illustrating different topologies at different times associated with the timeline shown in FIG. 7 in accordance with an embodiment of the present invention.

Referring back to FIG. 2 in combination with FIGS. 7 and 8, in one embodiment, media session 240 provides scheduling for files using unique identifiers. The unique identifiers can by universal resource locator type addresses (URLs), or other appropriate non-random type identifiers. More specifically, FIG. 7 illustrates a likely media timeline 700 showing effects (FX) 702 and 704 occurring during times 5 to 20 seconds and 15 to 20 seconds, respectively. The resulting topologies are illustrated in FIG. 8. As shown, each node has a unique identifier associated therewith. Source node 806 with unique identifier 1 is first coupled to sink node 808 with identifier 2. Nodes 806 and 808 make up a partial topology in that it is neither loaded nor resolved. Next, media session 240 determines that a decoder is necessary for the topology and decoder 810 is added to the topology with unique identifier 3. Thus, the topology is now node 806 followed by node 810 and then node 808. To provide a fully loaded topology, media processor operates on the topology to provide an effect appropriate for the time 5 second to 10 seconds. The resulting topology therefore is shown including node 812 with unique identifier 4.

According to an embodiment, the resulting topology can be reused using the unique identifiers to create a topology appropriate for time 15 seconds to 20 seconds. More specifically, since nodes 806, 810 and 808 can be reused, node 812 can be swapped out for an appropriate effect if a different effect is desired for time 15 seconds to 20 seconds. Moreover, if another topology has been created with a desired effect, that topology will include a unique identifier associated with the effect and that unique identifier can be located, found and inserted into a current topology. Any of the nodes can be swapped out for other nodes using the unique identifiers. Thus, for example, if the same effects are desired for another file, the source node 1806 can be swapped out.

The different topologies illustrated in FIG. 8 show that once a topology is specified, it can be static until modified by an external object. Topology embodiments described allow callers to traverse a whole topology via symbolic connection mechanisms and enumerate connected inputs and outputs on each node. Thus, to build and use topologies, an embodiment is directed to methods and data structures that enable a user, such as a developer, to build and use topologies.

An embodiment is directed to methods that allow a user to pre-specify which object to use prior to a topology being resolved or used by media processor 220. The user can set either static or dynamic properties for an object. To allow a user of a timeline to set static and varying properties on an object that hasn't been created yet, for example, for resource management reasons, one embodiment is directed to allowing a user to set the properties on a proxy object, or properties object. A proxy object can be created, loaded with properties, then follow the created object through a topology and be used by media processor 220 to set properties on the object for different frames as directed.

Other user methods provide a user with different abilities including: to remove nodes; to create blank nodes; to validate a topology; to query what node is connected to a given input stream or output stream; to enable a user to set the output media type of a given output stream for a node; to determine and name a topology descriptor of the currently loaded topology; to make a current node a copy of the node that is passed in as input; set an output stream identifier provided on an output node; to set a media source directly and provide a descriptor; to indicate to media processor 220 which of a plurality of output streams should wait for a request before processing the request from the remaining outputs; and to identify a discardable stream with a flag so that media processor 220 does not necessarily have to provide all received samples that are input to the output stream of a tee node.

Other methods are internal for a topology to function. For example, an acceptable media type can be a partial media type that provides information for a tee node as to where the node should be positioned in the fully resolved topology. If an acceptable media type is set as an uncompressed media type and the source is providing compressed data, then the tee node will be inserted after a decompressor. If the acceptable media type is set as a compressed media type, and the source provides compressed data, then the tee node will be inserted before the decompressor. Another internal method includes setting a flag identifying a topology as "dirty" so that further resolving will be performed. Note that the topology lets a user or application specify the data required by a topology, but does not perform the functionality, such as inserting tee nodes and the like. Rather, topology loader 250 can be configured to perform the actions required via a topology API.

The topology descriptor which can be set by a user allows interaction between topologies and a user. For example, using the topology descriptor, a user can (1) find how many inputs or output streams are associated with a particular topology; (2) find out the major type of each input/output stream for a topology; and (3) select or deselect a particular stream in a topology. Identifying the major type of input and output stream benefits a user by enabling the user to make consistent connections between topologies.

In one embodiment, the topology descriptor is a collection of topology stream descriptors. Each topology stream descriptor can be identified by a stream identifier. Each stream in the topology can be turned on or off by using SelectStream/DeselectStream. In the embodiment, a topology is not built for streams that are deselected. A user can determine the number of input stream descriptors for the topology from which the topology descriptor was obtained.

In view of the many possible embodiments to which the principles of this invention can be applied, it will be recognized that the embodiment described herein with respect to the drawing figures is meant to be illustrative only and are not be taken as limiting the scope of invention. For example, those of skill in the art will recognize that the elements of the illustrated embodiment shown in software can be implemented in hardware and vice versa or that the illustrated embodiment can be modified in arrangement and detail without departing from the spirit of the invention. Therefore, the invention as described herein contemplates all such embodiments as can come within the scope of the following claims and equivalents thereof.

We claim:

1. A multimedia processing system comprising:
a media processor component configured to process received media data;
a media session component coupled to the media processor component, the media session component configured to determine a timeline for events to occur for performing media processing; and
a topology loader component coupled to the media session component, the topology loader component configured to load a topology that describes a flow for the received media data through a plurality of multimedia components connected in a certain order to enable processing via an extensible symbolic abstraction of the multimedia components, the topology loader configured to ensure that events described in the topology occur, wherein the topology is independent of maintaining a stream state of control information for the plurality of multimedia components that enables dynamic adding and removing of one or more multimedia components from the topology.

2. The multimedia processing system of claim 1, further comprising:
a media sink component coupled to the media processor component, the media sink component configured to determine a media stream for output from the multimedia processing system; and
a media source component coupled to the media processor component, the media source component configured to supply media data for processing.

3. The multimedia processing system of claim 1 wherein the topology is configured to symbolically provide data flow information.

4. The multimedia processing system of claim 1 wherein the topology is the extensible symbolic abstraction of media objects, the media objects independent of an instantiation requirement.

5. The multimedia processing system of claim 1 wherein the topology includes a segment topology node configured to provide an encapsulated topology that can be inserted and deleted from a topology, the segment topology node including one or more inputs and one or more outputs and one or more nodes.

6. The multimedia processing system of claim 1 wherein the topology includes a tee node configured to provide a primary and secondary output stream therefrom, the tee node configured to respond to logic dictating a discard ability of data output from one or more of the primary and the secondary output stream.

7. The multimedia processing system of claim 1 wherein the topology includes a demultiplexer node configured to split media into different types of media from a combined input.

8. The multimedia processing system of claim 7 wherein the combined input is an interleaved audio and video input, the demultiplexer node configured to split the audio from the video and provide at least an audio output and a video output.

9. The multimedia processing system of claim 1 wherein the topology can be fully specified and independent of instantiated media objects.

10. The multimedia processing system of claim 9 wherein the topology being fully specified and independent of instantiated media objects enables the topology to remain an abstraction and enables the topology to be shared and instantiated multiple times.

11. The multimedia processing system of claim 1 wherein the topology is a fully loaded topology wherein connections between a plurality of nodes in the topology are guaranteed, each media type required by the topology is negotiated and each media object in the topology is instantiated.

12. The multimedia processing system of claim 1 wherein the media objects are instantiated when the topology is resolved.

13. The multimedia processing system of claim 1 wherein the topology includes a plurality of nodes, each node including one or more of the media objects, each of the plurality of nodes is identifiable via a unique identifier.

14. The multimedia processing system of claim 13 wherein the unique identifier enables sharing and reusing the nodes in a plurality of topologies.

15. A computer-implemented method for creating a data structure that defines a topology that identifies a flow of multimedia data through a collection of one or more media objects forming one or more nodes, the method comprising:
   identifying by a processing unit a connection between one or more nodes; and
   abstracting the connection between the nodes to enable the topology to be fully or partially specified independent of instantiation of the media objects, wherein the topology includes a segment topology node configured to provide an encapsulated topology that can be inserted and deleted from the topology, the segment topology node including one or more inputs and one or more outputs.

16. The method of claim 15 wherein the abstracting enables a delay between negotiating one or more media types for the topology and loading the media objects.

17. The method of claim 15 wherein the topology includes a tee node configured to provide a primary and secondary output stream therefrom, the tee node configured to respond to logic dictating a discardability of data output from one or more of the primary and the secondary output stream.

18. The method of claim 15 wherein the topology includes a demultiplexer node configured to split media into different types of media from a combined input.

19. The method of claim 18 wherein the combined input is an interleaved audio and video input, the demultiplexer node configured to split the audio from the video and provide at least an audio output and a video output.

20. The method of claim 15 wherein each node is identifiable via a unique identifier.

21. The method of claim 15 wherein the topology is operable via one or more user interfaces allowing a user to pre-specify which media object to use prior to the topology being resolved or used by a media processor.

22. The method of claim 21 wherein the user interface enables a user to set static and dynamic properties for the media objects via a timeline source.

23. The method of claim 21 wherein the user interface enables a user to set properties on a proxy object, the proxy object being created, loaded with properties, and configured to follow through the topology and processed according to properties set on the media object associated with identified frames.

24. The method of claim 15 wherein the topology is identified by one or more topology descriptors enabling interaction between a user and the topology.

25. The method of claim 24 wherein the topology descriptor identifies a collection of topology stream descriptors, each topology stream descriptor identifying a media stream.

26. A computer-readable medium having computer-executable instructions for creating a data structure that defines a topology that identifies a flow of multimedia data through a collection of one or more media objects forming one or more nodes, the computer-executable instructions performing acts comprising:
   identifying a connection between one or more nodes; and
   abstracting the connection between the nodes to enable the topology to be fully or partially specified independent of instantiation of the media objects, wherein the topology includes a segment topology node configured to provide an encapsulated topology that can be inserted and deleted from the topology, the segment topology node including one or more inputs and one or more outputs.

27. The computer-readable medium of claim 26 wherein the abstracting enables a delay between negotiating one or more media types for the topology and loading the media objects.

28. The computer-readable medium of claim 26 wherein the topology includes a tee node configured to provide a primary and secondary output stream therefrom, the tee node configured to respond to logic dictating a discardability of data output from one or more of the primary and the secondary output stream.

29. The computer-readable medium of claim 26 wherein the topology includes a demultiplexer node configured to split media into different types of media from a combined input.

30. The computer-readable medium of claim 29 wherein the combined input is an interleaved audio and video input, the demultiplexer node configured to split the audio from the video and provide at least an audio output and a video output.

31. The computer-readable medium of claim 26 wherein each node is identifiable via a unique identifier.

32. The computer-readable medium of claim 26 wherein the topology is operable via one or more user interfaces allowing a user to pre-specify which media object to use prior to the topology being resolved or used by a media processor.

* * * * *